(12) United States Patent
Aldrich et al.

(10) Patent No.: US 8,310,570 B1
(45) Date of Patent: Nov. 13, 2012

(54) REPAIRING DEFECTIVE PIXELS (75) Inventors: Bradley C. Aldrich, Austin, TX (US);
Ping-Sing Tsai, Austin, TX (US);
Matthew P. Wingert, Cedar Park, TX (US)

(73) Assignee: Marvell International Ltd. (BM)

( * ) Notice: Subject to any disclaimer, the term of this patent is extended or adjusted under 35 U.S.C. 154(b) by 390 days.

(21) Appl. No.: 12/574,790

(22) Filed: Oct. 7, 2009

Related U.S. Application Data (60) Provisional application No. 61/103,708, filed on Oct. 8, 2008.

(51) Int. Cl.
*H04N 9/64* (2006.01)
(52) U.S. Cl. .................................... 348/246
(58) Field of Classification Search .......... 348/175, 348/222.1, 246, 247, 272–283
See application file for complete search history.

(56) References Cited

U.S. PATENT DOCUMENTS

| | | | |
|---|---|---|---|
| 6,512,540 B2 | 1/2003 | Lathrop | |
| 6,904,169 B2 | 6/2005 | Kalevo et al. | |
| 7,102,669 B2 | 9/2006 | Skow | |
| 7,511,748 B2 * | 3/2009 | Kagle et al. | 348/246 |
| 7,649,555 B2 * | 1/2010 | Noh | 348/246 |
| 7,800,661 B2 * | 9/2010 | Forutanpour | 348/246 |
| 8,026,964 B2 * | 9/2011 | Walter et al. | 348/246 |
| 2003/0184659 A1 | 10/2003 | Skow | |
| 2005/0030395 A1 * | 2/2005 | Hattori | 348/246 |
| 2006/0221214 A1 | 10/2006 | Yanof et al. | |
| 2008/0075354 A1 | 3/2008 | Kalevo | |
| 2009/0067734 A1 | 3/2009 | Kalevo | |

* cited by examiner

*Primary Examiner* — Trung Diep

(57) ABSTRACT

Apparatus, methods, and other embodiments associated with repairing defective pixels are described. In one embodiment, an apparatus includes pixel defect logic configured to retrieve pixel repair information associated with at least one defective sensor of an array of photo sensors. Pixel replication logic is configured to repair defective pixels in a stream of image pixels based, at least in part, on the pixel repair information.

18 Claims, 5 Drawing Sheets

REPAIRING DEFECTIVE PIXELS

CROSS REFERENCE TO RELATED APPLICATIONS

This application claims the benefit of U.S. provisional application Ser. No. 61/103,708, filed on Oct. 8, 2008, which is hereby incorporated by reference.

BACKGROUND

An image sensor can be used to capture digital image data. The image sensor is formed by arrays of photo sensors, for example, charge coupled device (CCD) sensors or CMOS sensors. One photo sensor captures data associated with one pixel of image data. Increasing the number of photo sensors used to capture a digital image increases the quality of the digital image.

Image sensors are manufactured in silicon chips and include millions of individual photo sensors arranged in arrays. Individual photo sensors are small and have submicron features. These submicron features can make producing a defect free array of photo sensors on a silicon chip difficult. Defective sensors include regions that display either increased dark current, electrical faults or variations in sensitivity. The type and number of defective photo sensors is often used as a screening mechanism in the manufacturing process of chips with image sensors. Silicon chips with too many defective photo sensors are not usable and are not marketable. The type and number of defective photo sensors may influence both chip yield and the price of a silicon chip.

There are different kinds of defects that can occur on an image sensor. Defects include isolated point defects, cluster defects, and row/column defects. In addition to these defects, a defective photo sensor can generate defective pixels that have a non-uniform response with respect to neighboring pixels.

SUMMARY

In one embodiment, an apparatus includes pixel defect logic configured to retrieve pixel repair information associated with at least one defective sensor of an array of photo sensors. Pixel replication logic is configured to repair defective pixels in a stream of image pixels based, at least in part, on the pixel repair information.

In another embodiment, an apparatus comprises point defect logic to detect a point defect pixel in an array of adjacent pixels. For example, a point defect pixel is a pixel in a line of pixels that is not repairable based, at least in part, on other pixels in the line of pixels, and where the point defect pixel is between adjacent pixels associated with a same color as the point defect pixel. The apparatus also includes a two-dimensional filter to adjust the point defect pixel based, at least in part, on the array of adjacent pixels.

In another embodiment, a method includes retrieving a cluster type associated with a pixel cluster of two or more adjacent pixels of a sequential string of pixels. At least some of the defective pixels are repaired based, at least in part, on the cluster type.

BRIEF DESCRIPTION OF THE DRAWINGS

The accompanying drawings, which are incorporated in and constitute a part of the specification, illustrate various example methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are example methods and other embodiments associated with repairing defective pixels of image data. After a high density array of photo sensors is produced, the array is tested to determine which photo sensors may be defective. There are several classifications of defects that can occur on an image sensor. These include isolated point defects, cluster defects, and row/column defects, which may manifest as stuck high or stuck low faults. In addition to the stuck high/low faults, pixels that have a non-uniform response with respect to their neighbor pixels can also be considered as defective. Table 1 describes some types of defects that can be identified:

TABLE 1

| Defect Type | Description |
| --- | --- |
| Stuck High | Isolated point defect with high output voltage usually due to high dark current. |
| Stuck Low | Isolated point defect with low output voltage or poor response |
| Solid Cluster | Group of adjacent pixels with point defects |
| Spread Cluster | Group of near adjacent pixels with point defects |
| Point defect | Pixel which deviates from its adjacent pixels by some percent when illuminated to about 70% of saturation |
| Dead Row Column | Row of pixels that are stuck high or low Large number of point defects within a single column. |

It will be assumed that defective photo sensors generate defective pixels. In one embodiment, defective photo sensors are located and the locations are stored in a memory along with repair information. The repair information indicates how to repair defective pixels or clusters of defective pixels generated by the defective photo sensors. Repairing defective pixels improves the image quality. The manufacturing yield of chips implementing an array of photo sensors is increased when pixels associated with one or more defective photo sensors is repaired.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores instructions and/or data. A computer-readable medium may take forms, including, but not limited to, non-volatile media, and volatile media. Non-volatile media may include, for example, optical disks, magnetic disks, flash memory, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

Figure 1:
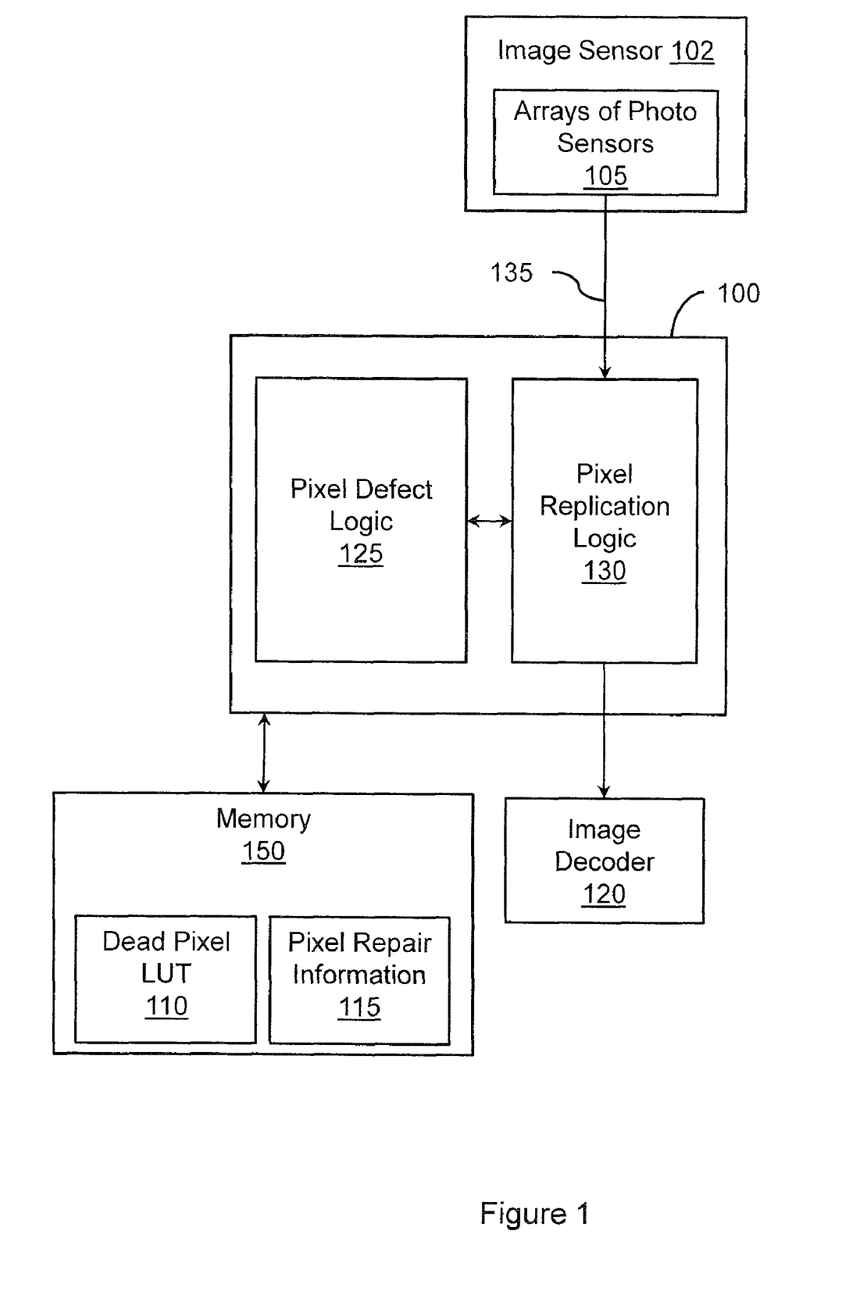
FIG. 1 illustrates an embodiment of an apparatus associated with repairing defective pixels.

FIG. 1 illustrates one embodiment of an apparatus 100 that is configured to repair defective pixel data generated by an image sensor 102. The image sensor 102 includes an array of photo sensors 105 that generate pixel data when capturing an image (e.g. still image or video image). The image sensor 102 and the photo sensors 105 are manufactured on a chip of silicon. As previously mentioned, a chip of silicon is tested after manufacturing to determine where defective photo sensors are located.

Types of defects can include for example a photo sensor being stuck at high (e.g. value of one), stuck at low (e.g. value of zero), defects affecting a column or row of sensors, and so on. Table 1 above shows example types of defects. The locations of detective photo sensors and the type of defect are stored, for example, in a dead pixel look up table 110. The locations correspond to row and column addresses/coordinates of the defective photo sensors. In one embodiment, the look up table 110 is a sorted table of coordinates of the defective pixels or cluster of defective pixels in the photo sensor array 105. Each entry of the table 110 can contain three fields; a row address, a column address, and a code defining the pixel defect type. Based on the locations and types of photo sensor defects, pixel repair information 115 is generated for the defective sensors and stored in memory 150. Examples of the pixel repair information 115 will be described below with reference to Table 2.

The apparatus 100 includes pixel defect logic 125 and pixel replication logic 130. When the apparatus 100 processes pixel data 135 from the image sensor 102, the pixel defect logic 125 retrieves pixel repair information 115 associated with defective photo sensors that have been identified from the array of photo sensors 105. The pixel replication logic 130 is configured to repair defective pixels in the pixel data 135 based, at least in part, on the pixel repair information 115. A defective pixel presumably has an incorrect pixel value. The incorrect pixel value is changed to a different value in accordance with the pixel repair information 115. Hence, the defective pixel is repaired. Clusters of defective pixels can be repaired in this manner.

After being repaired, the pixel data 135 is then transmitted from the apparatus 100 to an image decoder 120. The image decoder 120 processes the pixel data to generate an image.

In one embodiment, the pixel repair information 115 describes how to repair pixels associated with the defective photo sensors. The pixel repair information 115 comprises filtering information to filter certain pixels with values from neighboring pixels, which is described in more detail in Table 2. The array of photo sensors 105 is analyzed at some point to determine locations and types of defects. Corresponding pixel repair information 115 is generated for particular defective photo sensors and/or for clusters of defective photo sensors. A pixel generated by a defective photo sensor is referred to herein as a defective pixel. The pixel repair information 115 can include pixel addresses that identify defective pixels and/ or clusters of defective pixels to be repaired. The pixel repair information 115 includes instructions, used by the pixel replication logic 130, for repairing defective pixels. For example for a particular pixel or pixel cluster, the instructions can indicate to replace the defective pixel with a value from an adjacent pixel. In another example, the defective pixel may be repaired by substituting an average value of adjacent pixels representing the same color for the value of the defective pixel.

The pixel repair information 115 can also include a pixel cluster type for a designated group of adjacent pixels. The pixel cluster type identifies how a string of adjacent pixels are ordered as good pixels and/or bad pixels. Cluster types are described in more detail with reference to Table 2 below.

Figure 2:
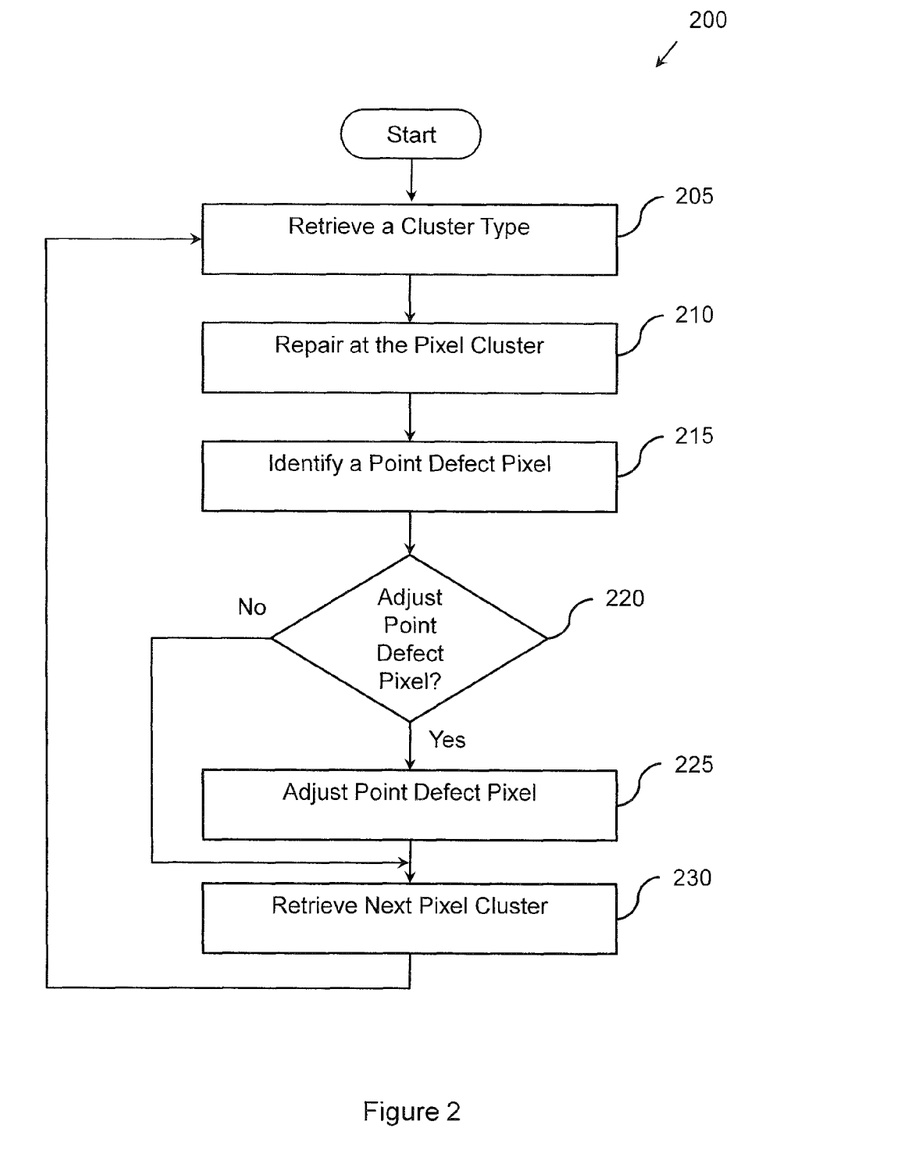
FIG. 2 illustrates an embodiment of a method associated with repairing defective pixels.

With reference to FIG. 2, an embodiment of a method 200 for correcting defective pixels is illustrated. The method 200 is described based on the apparatus 100 of FIG. 1 but of course, other apparatuses or systems can be used.

The method 200 begins by processing pixel data from photo sensors. In one embodiment, the pixel data is a stream of RAW Bayer pixels. At 205, for a particular string of pixels being processed from the photo sensors, the method retrieves a cluster type associated with the pixel cluster formed by the string of pixels. As discussed above, the cluster type is part of the pixel repair information 115 and indicates how to repair at least some defective pixels in the pixel cluster. The cluster type may be retrieved from a memory or a lookup table (LUT).

At 210, the pixel cluster is repaired based, at least in part, on the cluster type and pixel repair information associated with the cluster type. For example, the defective pixels may be repaired by replacing a defective pixel with the value of an adjacent pixel representing the same color as the defective pixel. In another example, a defective pixel may be repaired by replacing the defective pixel with an average value of two or more adjacent pixels representing the same color. Repairing the defective pixels is based, at least in part, on the positions of defective pixels and non-defective pixels in the pixel cluster.

At 215, a point defect pixel in the pixel cluster is identified if present based, at least in part, on the pixel cluster type. A point defect pixel may not be reparable and is discussed in more detail with reference to Table 2 and FIG. 3. Point defect pixels generally occur when several back-to-back bad pixels are grouped together in the pixel cluster being processed.

At 220, a determination is made on whether the point defect pixel is adjustable. In one embodiment, the determination is made based on mean values and variances of the point defect pixel and other pixels representing the same color surrounding the point defect pixel. Examples of how to calculate the mean and variance values is discussed with reference to FIG. 5 and in other examples below.

At 225, when the point defect pixel is adjustable, the point defect pixel is adjusted. The point defect pixel is adjusted by filtering the point defect pixel in two directions. The point defect pixel can be filtered with a two-dimensional median filter. At 230, the next pixel cluster from the pixel data is retrieved and the processing repeats until all the pixel data is processed or the method 200 is terminated by some other event. If the point defect pixel cannot be adjusted at 220, then the method moves to block 230 and the method continues.

Table 2 shows one example of pixel cluster types and pixel repair information that can be used at 215 of method 200 to repair pixels. In one embodiment, this information can be stored in the pixel repair information 115 of FIG. 1. The information describes how pixels within a cluster of pixel values are repaired based on positions of good and bad pixel values in a sequence of five pixels (e.g. identified as pixels C, D, E, F, and G). Table 2 shows different sequences of good and bad pixel combinations for a five pixel cluster. The "Fault Class" represents the pixel cluster type. For each type of pixel sequence (pixel cluster type), repair equations/instructions are provided that are used to repair such a pixel cluster type.

TABLE 2

| Fault Class | 5 Pixel Window | | | | | Repair Equations or Instructions | Comment |
|---|---|---|---|---|---|---|---|
| | C | D | E | F | G | | |
| Point Defect | Bad | Good | Good | Good | Good | C = (A + E)/2 | Repair |
| Sparse Clusters | Bad | Good | Bad | Good | Good | C = A, E = G | Repair |
| | Bad | Good | Good | Bad | Good | C = (A + E)/2, F = (D + H)/2 | Repair |
| | Bad | Good | Good | Good | Bad | C = (A + E)/2, G = (E + I)/2 | Repair |
| Adjacent Fault Clusters | Bad | Bad | Good | Good | Good | C = (A + E)/2, D = (B + F)/2 | Repair |
| | Bad | Bad | Bad | Good | Good | C = A, D = (B + F)/2, E = G | Repair |
| | Bad | Bad | Bad | Bad | Good | C = A, D = B, E = G, F = H | Repair |
| | Bad | Bad | Bad | Bad | Bad | C = A, D = B, F = H, G = I | Leave Point Defect E |
| Sparse Adjacent Fault Clusters (3 Defects) | Bad | Good | Bad | Bad | Good | C = A, E = G, F = (D + H)/2 | Repair |
| | Bad | Good | Bad | Good | Bad | C = A, G = I | Leave Point Defect E |
| | Bad | Good | Bad | Bad | Bad | C = (A + E)/2, F = (D + H)/2, G = (E + I)/2 | Repair |
| | Bad | Bad | Good | Good | Bad | C = (A + E)/2, D = (B + F)/2, G = (E + I)/2 | Repair |
| | Bad | Bad | Good | Bad | Good | C = (A + E)/2, D = B, F = H | Repair |
| Sparse Adjacent Fault Clusters (4 Defects) | Bad | Good | Bad | Bad | Bad | C = A, F = (D + H)/2, G = I | Leave Point Defect E |
| | Bad | Bad | Good | Bad | Bad | C = (A + E)/2, D = B, F = H, G = (E + I)/2 | Repair |
| | Bad | Bad | Bad | Good | Bad | C = A, D = (B + F)/2, G = I | Leave Point Defect E |

Sixteen rows of pixel cluster types are shown in Table 2 with various sequences of "good" and "bad" pixels. All possible sequences are not shown. For example as shown in the last row of Table 2, one cluster type is a sequence of 'bad', 'bad', 'bad', 'good', and 'bad.' Based on the cluster type, Table 2 indicates how to repair the cluster type as seen in the "Repair Equations" column. In Table 2, the clusters of pixels contain five pixels although other amounts of pixels can be used. The Repair Equations can be changed based on desired properties of the image sensor 102. The equations can be determined by testing an image sensor, measuring pixel responses, and determining how pixels are desired to be changed.

The Repair Equations refer to letters "A" to "I" that represent pixel locations A to I in a string of pixels, which include pixels C to G. For example, the string of pixels A to I refer to a nine pixel string as shown and described in FIG. 3.

Figure 3:
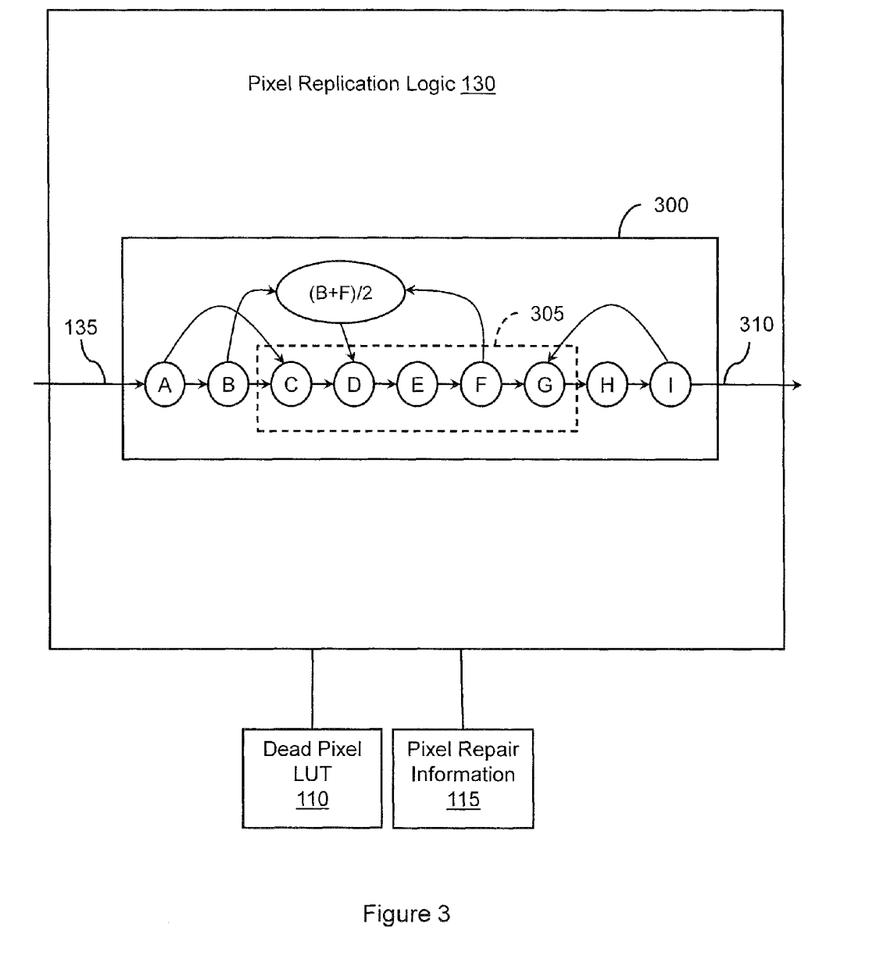
FIG. 3 illustrates an embodiment of a delay line associated with repairing defective pixels.

With reference to FIG. 3, another embodiment of the pixel replication logic 130 is shown, which further includes a delay line 300. The delay line 300 is implemented with a string of back-to-back delay elements represented in FIG. 3 by circles 'A' through 'I'. The delay elements 'A'-'I' store one pixel each from the stream of image pixels 135. The delay elements 'A'-'I' may be registers, flip-flops, or other storage devices that store and shift pixel values at periodic or other controlled clock cycle intervals.

In one embodiment, the pixel replication logic 130 uses a filter window (e.g. nine pixels A-I, or other amount) and the repair information 115 to determine how to repair pixels. A five element replication window 305 is the target of the repair process and is centered within the nine element filter window. The filter window is a delay line that stores and shifts the pixel data thru a sequence of registers in a streaming fashion. When the current address read from the LUT 110 matches the pixel X and Y count, the five pixels in the replication window 305 are modified according to the pixel repair information 115.

As the pixel replication logic 130 processes the stream of image pixels 135 from the photo sensors 105, the delay line 300 shifts the stream of image pixels 135 through the delay line 300 one pixel at a time. The pixel replication logic 130 uses a predefined replication window 305 in which to repair defective pixels in a group/cluster of pixels as the stream of image pixels 135 is sequentially shifted through the delay line 300. The replication window 305 defines a string of adjacent back-to-back pixels in the delay line 300, which is processed as a pixel cluster. In the illustrated example, five pixels form the cluster but other numbers of pixels can be implemented.

As pixel clusters are evaluated within the replication window 305, the pixel replication 103 determines the addresses of the pixel cluster. The addresses are compared to the dead pixel look up table addresses 110 to identify whether the pixels came from defective photosensors.

In one embodiment, the pixel replication logic 130 repairs a defective pixel in the replication window 305 by using pixel repair information 115 (e.g. Table 2) that corresponds to the type of pixel cluster. For example, a pixel can be repaired by either replacing the defective pixel with a new value or substituting an average value of two adjacent pixels in the delay line 300 to the defective pixel. The defective pixel can be replaced or substituted with an average value of pixel values associated with a same color as the defective pixel when the pixel values represent RAW Bayer data. Five pixels are shifted into the delay elements 'C' to 'G' of the replication window 305 and then one or more of these five pixels are repaired if any of the pixels are defective (e.g., bad).

FIG. 3 illustrates the case when pixel values in delay elements 'C', 'D', 'E', and 'G' are bad and a pixel value in delay element 'F' is good. This pixel sequence is shown as the last entry of Table 2 under "Sparse Adjacent Fault Cluster." In this case, the pixel replication logic 130 repairs a pixel value in delay element 'C' by copying the pixel value in delay element 'A' into delay element 'C' (e.g. repair equation states C=A, which is shown in FIG. 3 as the arrow pointing from A to C). The pixel value in delay element 'G' is repaired by copying the pixel value in delay element 'I' into delay element 'G'. The pixel value in delay element 'D' is repaired by replacing the pixel value in delay element 'D' with the average of the pixel values in delay elements 'B' and 'F' (e.g., (B+F)/2). One bad pixel value in delay element 'E' cannot be repaired because there are too many adjacent bad pixel values in the replication window 305 (see "Comment" column of Table 2: "Leave Point Defect E").

Therefore, the pixel value in delay element 'E' is shifted out of the replication window 305 and labeled as a point defect pixel. The point defect pixel is a pixel in a line of pixels that is not repairable based on other pixels in the line of pixels. The point defect pixel is adjusted as described below with reference to FIGS. 4 and 5. In one embodiment, after the pixel values in delay elements 'C'-'G' in the pixel replication window 305 are repaired, these pixel values are shifted out on an output line 310 while new pixel values from the stream of image pixels 135 are shifted in.

In one embodiment, the pixel replication logic 130 provides a pixel address to the pixel defect logic 125 (e.g. a two dimensional address). The two-dimensional address may correspond to the horizontal and vertical location of a pixel generated by the array of photo sensors 105. Based on the two-dimensional address, the pixel defect logic 125 provides a correction field to the pixel replication logic 130. For example, the correction field corresponds to one of the possible pixel sequences from Table 2. As explained above, each type of sequence includes instructions to correct bad pixels in the sequence (e.g. repair equations). The pixel replication logic 130 repairs defective pixels based, at least in part, on the correction field and the associated repair equations.

In some embodiments, the apparatus 100 of FIG. 1, and/or the method 200 of FIG. 2 may be at least partially implemented in a chip. The chip may be comprised of semiconductor circuits or other types of circuits as understood by those of ordinary skill in the art. The semiconductor circuits implement logic to perform at least part of the functionality disclosed and equivalents. In another embodiment, one or more components may be implemented with a combination of hardware and/or stored instructions.

Figure 4:
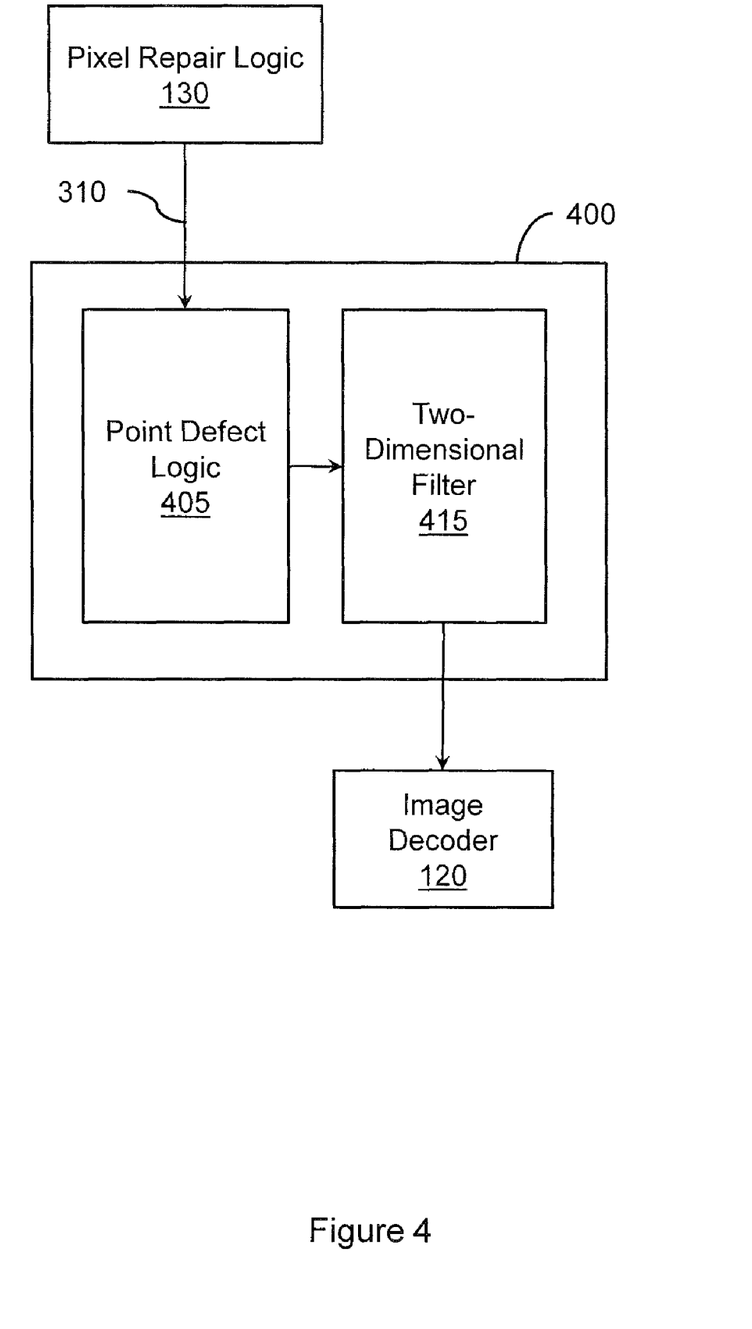
FIG. 4 illustrates one embodiment of point defect logic.

FIG. 4 illustrates one embodiment of an apparatus 400 associated with repairing pixels that are point defect pixels. Point defect pixels are generally a single isolated pixel with an incorrect value. A point defect pixel is surrounded by other pixels in the horizontal and vertical directions that contain correct or repaired pixel values. Repairing point defect pixels improves the quality of an image that is later decoded. In one embodiment, the apparatus 400 receives pixels that are outputted from the pixel replication logic 130 on output line 310.

Thus, point defects that could not be repaired are passed to a 2D filter that applies an additional repair mechanism for dead pixels.

As discussed above with reference to FIGS. 1 and 2, the point defect pixel may be a pixel that was part of a cluster of pixels of several adjacent back-to-back pixels. The point defect pixel is one pixel that was uncorrectable by the apparatus 100 of FIG. 1. The apparatus 400 of FIG. 4 is configured to filter the surrounding pixels to determine a repair value to assign to the point defect pixel. The point defect pixel and surrounding pixels can be filtered with a two-dimensional median filter to repair the point defect pixel. Not all point defect pixels may be repaired. As discussed below, if a variance between the point defect pixel and surrounding pixels is not large enough, the point defect pixel may not be repaired.

In one embodiment, the apparatus 400 is comprised of a point defect logic 405 that is configured to receive an array of adjacent pixels from an input line 410. The point defect logic 405 detects a point defect pixel in the array of adjacent pixels. If the point defect pixel is correctable, the point defect pixel and the array of adjacent pixels are passed through a two-dimensional filter 415. The two-dimensional filter 415 is configured to adjust the point defect pixel and pass the adjusted point defect pixel to the image decoder 120 for further processing into a digital image.

In one embodiment, the two-dimensional filter 415 adjusts the point defect pixel based, at least in part, on adjacent pixels that represent the same color. In another embodiment, the two-dimensional filter 415 adjusts the point defect pixel based, at least in part, on a series of calculations. For example, the two-dimensional filter 415 calculates a local mean, $\mu$, of the point defect pixel based, at least in part, on pixels adjacent to the point defect pixel. The local mean may be an average of adjacent pixels representing the same color as the point defect pixel. The two-dimensional filter 415 calculates a local variance, $V(x,y)$, of the point defect pixel based, at least in part, on the local mean. The local variance is calculated to measure the variation of current pixel values and adjacent pixel values to the local mean.

In one embodiment, the two-dimensional filter 415 determines whether to correct the point defect pixel based, at least in part, on the local mean and the local variance. For example, a pixel variation is calculated as the sum of the squares of the mean deviation of the closest eight pixels to the point defect pixel. The pixel variation of pixel $P_{(x,y)}$ may be expressed as:

$$V(x,y)=(P_{x,y}-\mu)^2$$

The local variance is compared to a value of the pixel variation multiplied by a scaling factor, "scale", to determine whether the point defect pixel is filtered and adjusted according to:

$$\text{if } V(x, y) \geq \text{scale} * \sum_{\substack{i=2,0,+2 \\ j=-2,0,+2}} (P_{x+i,y+j} - \mu)^2 \text{ then}$$

Apply median filter to point defect pixel to adjust the point defect pixel;
else
Do not adjust point defect pixel.

The scaling factor, "scale", may be a programmable value. The application of the median filter is effective at eliminating point defects while reducing the number of false positives on pixels that are not actually point defect pixels.

Figure 5:
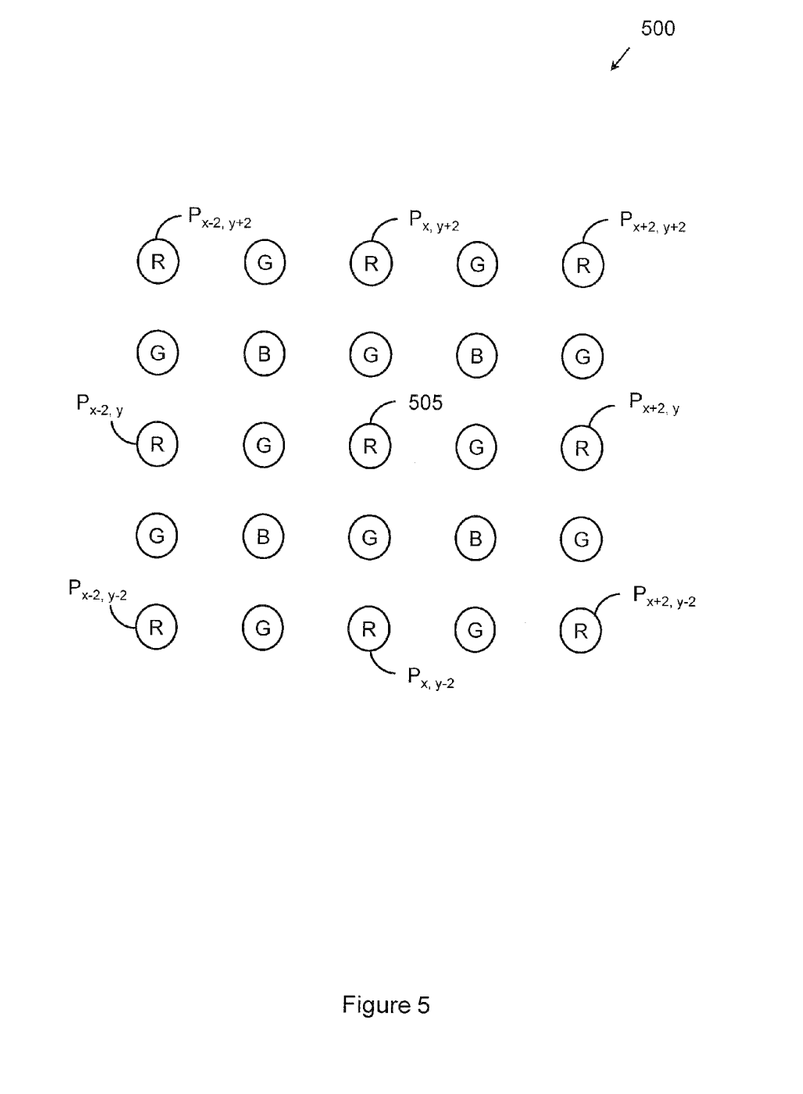
FIG. 5 illustrates one embodiment of a 5×5 grid of pixels associated with repairing defective pixels.

FIG. 5 illustrates one example of how the two-dimensional filter 415 of FIG. 4 can adjust a point defect pixel based, at least in part, on adjacent pixels of the same color. An array of pixels is shown as circles where each circle represent one pixel. When the array of adjacent pixels is a RAW Bayer space of pixels 500, pixels representing different colors may be between the point defect pixel and the pixels representing the same color as the point defect pixel. A red pixel is represented by an 'R' inside a circle and blue and green pixels are represented by a 'B' or a 'G' inside a circle, respectively. The green is used to represent a luminance signal requiring high resolution. A red point defect pixel 505 is shown at the center of a 5×5 pixel array of adjacent pixels. In the RAW Bayer space of pixels 500, the next adjacent red pixels to the point defect pixel 405 are eight adjacent red pixels labeled as pixels '$P_{x-2,y+2}$', '$P_{x,y+2}$', '$P_{x+2,y+2}$', '$P_{x+2,y}$', '$P_{x-2,y}$', '$P_{x-2,y-2}$', '$P_{x,y-2}$', and '$P_{x+2,y-2}$'.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods may be implemented in a semiconductor chip. The methods can also be implemented with circuits.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    pixel defect logic configured to retrieve pixel repair information that comprises locations of defective photo sensors in an array of photo sensors;
    pixel replication logic configured to repair defective pixels generated by the array of photo sensors by identifying the defective pixels based on the locations of defective photo sensors where the defective pixels are repaired in a stream of image pixels based, at least in part, on the pixel repair information comprising filtering information; and
    point defect logic configured to identify a point defect pixel in the stream of image pixels after the pixel repair information is applied, wherein a point defect pixel is a pixel in the stream of image pixels that is not repairable by the pixel replication logic using the pixel repair information; and
    wherein the point defect logic is configured to adjust the point defect pixel by applying a two-dimensional filter based, at least in part, on a two dimensional array of values from pixels adjacent to the point defect pixel.

2. The apparatus of claim 1, where the pixel replication logic comprises:
    a delay line for storing pixels from the stream of image pixels in a group of delay elements, where the pixel replication logic functions to repair defective pixels in a replication window of pixels as the stream of image pixels is shifted through the group of delay elements.

3. The apparatus of claim 1, wherein the pixel repair information includes predetermined repair instructions for repairing two or more pixels in the stream of image pixels, wherein the predetermined repair instructions are associated with a predetermined location corresponding to a location of a defective photo sensor; and
    where the pixel replication logic is configured to repair a defective pixel that matches the predetermined location in accordance with the corresponding predetermined instructions.

4. The apparatus of claim 1, where the pixel replication logic is configured to provide a pixel address to the pixel defect logic, and where the pixel defect logic functions to provide repair information to the pixel replication logic when the pixel address matches a location of a defective photo sensor from the pixel repair information.

5. The apparatus of claim 1, where the pixel defect logic is configured to provide a correction field to the pixel replication logic, and where the pixel replication logic functions to repair defective pixels based, at least in part, on the correction field.

6. The apparatus of claim 1, where the pixel replication logic further comprises:
    a string of delay elements to sequentially shift the stream of image pixels, where a replication window of pixels is a string of adjacent back-to-back pixels in the string of delay elements, and where the pixel replication logic functions to repair defective pixels in the replication window of pixels as the stream of image pixels is sequentially shifted through the string of delay elements.

7. The apparatus of claim 6, where the pixel replication logic is configured to repair defective pixels in the replication window when a pixel address of a pixel in the replication window is equal to a pixel repair address in the pixel defect logic.

8. The apparatus of claim 6, where the pixel repair information provides information on how to repair one or more of the pixels in the replication window.

9. The apparatus of claim 1, wherein the pixel repair information includes predetermined repair instructions for repairing two or more pixels in a cluster of pixels based on a sequence of non-defective pixels and defective pixels in the cluster based on the locations of defective photo sensors of the array of photo sensors.

10. An apparatus, comprising:
    pixel replication logic configured to repair defective pixels generated by an array of photo sensors wherein the defective pixels are identified based on stored locations of defective photo sensors, wherein the defective pixels are repaired in a pixel cluster based, at least in part, on pixel repair instructions that are predefined for the defective photo sensors and for types of pixel clusters;
    point defect logic configured to detect a point defect pixel in the pixel cluster after the pixel repair instructions are performed, where a point defect pixel is a pixel in the pixel cluster that is not repairable with the pixel repair instructions; and a two-dimensional filter configured to adjust the point defect pixel based, at least in part, on a two dimensional array of values from pixels adjacent to the point defect pixel.

11. The apparatus of claim 10, where the two-dimensional filter functions to:

calculate a local mean of the point defect pixel based, at least in part, on adjacent pixels associated with the same color as the point defect pixel;

calculate a local variance of the point defect pixel based, at least in part, on the adjacent pixels associated with the same color and the local mean;

determine whether the point defect pixel is repairable based, at least in part, on the local mean and the local variance; and filter the point defect pixel with a two-dimensional median filter when the point defect pixel is repairable.

12. The apparatus of claim 11, where the apparatus is configured to repair the point defect pixel if the local variance is greater than or equal to a pixel variance value.

13. A method, comprising:

for a pixel cluster of two or more adjacent pixels of a sequential string of pixels, determining addresses of the pixel cluster and based on the addresses, determining a cluster type of the pixel cluster;

wherein the cluster type is based on a sequence of non-defective pixels and defective pixels of the pixels in the pixel cluster that is predetermined from locations of known defective photo sensors in an array of photo sensors used to generate the sequential string of pixels;

repairing two or more of the defective pixels in the pixel cluster based, at least in part, on the cluster type using at least predetermined repair instructions that are defined for the cluster type; and after repairing two or more of the defective pixels in the pixel cluster using the predetermined repair instructions:

identifying a point defect pixel in the pixel cluster that is not repairable based, at least in part, on the predetermined repair instructions;

determining whether the point defect pixel is adjustable; and adjusting the point defect pixel when the point defect pixel is adjustable by filtering the point defect pixel in two directions.

14. The method of claim 13, comprising:

shifting the pixel cluster into a delay line one pixel at a time, where the pixel cluster is a sequential line of pixels with two ends, where the delay line stores the pixel cluster and one or more pixels adjacent to both of the two ends, and where repairing at least some of the defective pixels is performed based, at least in part, on the pixel cluster and the one or more pixels adjacent to the two ends.

15. The method of claim 13, where repairing at least some of the defective pixels is performed by replacing a defective pixel with an adjacent pixel associated with the same color or by replacing a defective pixel with an average of two adjacent pixels associated with the same color.

16. The method of claim 13, wherein adjusting the point defect pixel comprises:

calculating a local mean of the point defect pixel based, at least in part, on adjacent pixels associated with a same color as the point defect pixel;

calculating a local variance of the point defect pixel based, at least in part, on adjacent pixels associated with the same color as the point defect pixel and based, at least in part, on the local mean;

determining if the point defect pixel is adjustable based, at least in part, on the local mean and the local variance; and adjusting the point defect pixel when the point defect pixel is adjustable by filtering the point defect pixel.

17. The method of claim 13, comprising:

comparing a cluster address associated with the pixel cluster with a type address used to retrieve the cluster type to determine when the cluster address and the type address are the same; and retrieving the cluster type when the cluster address and the type address are the same.

18. The method of claim 13, where repairing two or more of the defective pixels is based, at least in part, on positions of defective pixels and non-defective pixels in the pixel cluster.

* * * * *